(12) United States Patent
Kleinpeter et al.

(10) Patent No.: US 12,508,703 B2
(45) Date of Patent: Dec. 30, 2025

(54) HANDLING DEVICE FOR A MANUFACTURING ENVIRONMENT

(71) Applicant: Bayerische Motoren Werke Aktiengesellschaft, Munich (DE)

(72) Inventors: Gerhard Kleinpeter, Tiefenbach (DE); Philip Obst, Munich (DE); Jan Marvin Schäfer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 227 days.

(21) Appl. No.: 18/002,194

(22) PCT Filed: Jun. 21, 2021

(86) PCT No.: PCT/EP2021/066726
§ 371 (c)(1),
(2) Date: Dec. 16, 2022

(87) PCT Pub. No.: WO2022/002649
PCT Pub. Date: Jan. 6, 2022

(65) Prior Publication Data
US 2023/0339105 A1    Oct. 26, 2023

(30) Foreign Application Priority Data
Jul. 2, 2020  (DE) ............... 10 2020 117 455.1

(51) Int. Cl.
*B25J 5/00* (2006.01)
*B25J 9/16* (2006.01)
(Continued)

(52) U.S. Cl.
CPC ............. *B25J 9/162* (2013.01); *B25J 5/007* (2013.01); *B29C 64/379* (2017.08); *B33Y 30/00* (2014.12)

(58) Field of Classification Search
CPC .. B25J 11/00; B25J 5/007; B25J 9/162; B29C 64/379; B29C 64/232; B29C 64/241;
(Continued)

(56) References Cited

U.S. PATENT DOCUMENTS

| 11,407,073 B2 | 8/2022 | Geissler et al. |
| 2014/0316564 A1 | 10/2014 | Nakamura et al. |

(Continued)

FOREIGN PATENT DOCUMENTS

| CN | 108290283 A | 7/2018 |
| CN | 109798001 A | 5/2019 |

(Continued)

OTHER PUBLICATIONS

PCT/EP2021/066726, International Search Report dated Nov. 10, 2021 (Two (2) pages).

(Continued)

*Primary Examiner* — Stephen Holwerda
(74) *Attorney, Agent, or Firm* — Crowell & Moring LLP (57) ABSTRACT

A handling device for a manufacturing environment includes a manufacturing apparatus for additive manufacturing of an object, a robot device, a transport device, where the robot device is configured to interact with at least one component of the manufacturing apparatus, and a coupling device which is configured to couple the robot device detachably to the transport device. The transport device is configured to transport the robot device to at least one workstation and to uncouple the robot device from the transport device by the coupling device.

8 Claims, 4 Drawing Sheets

(51) Int. Cl.
 *B29C 64/379* (2017.01)
 *B33Y 30/00* (2015.01)

(58) Field of Classification Search
 CPC ............ B29C 64/236; G05B 19/41895; G05B 2219/40233; G05B 2219/40298; G05B 2219/40294; B33Y 30/00; Y02P 90/02; Y02P 90/60
 See application file for complete search history.

(56) References Cited

U.S. PATENT DOCUMENTS

| | | | |
|---|---|---|---|
| 2015/0316925 A1 | 11/2015 | Frisk | |
| 2016/0195390 A1 | 7/2016 | Nissen et al. | |
| 2016/0236867 A1* | 8/2016 | Brazeau | B25J 5/007 |
| 2017/0322542 A1* | 11/2017 | Zahorcak | G05B 19/4097 |
| 2018/0326576 A1* | 11/2018 | Riedel | B25J 19/022 |
| 2018/0361586 A1* | 12/2018 | Tan | B61J 99/00 |
| 2021/0129314 A1* | 5/2021 | Kobari | B25J 13/088 |
| 2021/0316412 A1* | 10/2021 | Geissler | B66F 9/063 |

FOREIGN PATENT DOCUMENTS

| | | |
|---|---|---|
| DE | 103 35 570 A1 | 2/2005 |
| DE | 10 2010 026 798 A1 | 1/2012 |
| DE | 20 2012 100 646 U1 | 6/2013 |
| DE | 10 2015 120 058 B3 | 3/2017 |
| DE | 10 2019 200 661 A1 | 3/2020 |
| EP | 0 335 752 A2 | 10/1989 |
| EP | 2 939 798 A1 | 11/2015 |
| WO | WO-2020043912 A2 * 3/2020 ........... B23Q 37/007 |

OTHER PUBLICATIONS

German Search Report issued in German application No. 10 2020 117 455.1 dated Aug. 29, 2021, with Statement of Relevancy (Six (6) pages).

English translation of Chinese-language Office Action issued in Chinese Application No. 202180032765.1 dated Feb. 28, 2025 (9 pages).

English translation of Chinese-language Office Action issued in Chinese Application No. 202180032765.1 dated Sep. 30, 2025 (10 pages).

* cited by examiner

HANDLING DEVICE FOR A MANUFACTURING ENVIRONMENT

BACKGROUND AND SUMMARY OF THE INVENTION

The invention relates to a handling device for a manufacturing environment, comprising at least one manufacturing apparatus for the in particular additive manufacturing of objects, the handling device having a robot device and a transport device, wherein the robot device is designed to interact with at least one component of the manufacturing apparatus and/or with the manufactured object, and the transport device is designed to transport the robot device.

Corresponding handling devices are known in principle from the prior art. For example, transport devices are known which are designed to transport various modules of manufacturing apparatuses, for example build modules, powder modules, and the like, or devices associated with manufacturing apparatuses, such as containers in storage facilities and the like. Such a transport device can, for example, be used to convey a build module into an apparatus for the additive manufacture of three-dimensional objects or to remove such a build module after the completion of a manufacturing procedure and transport it to a post-processing device. It is also known to use such transport devices for transporting containers in storage facilities.

Robot devices, for example multi-axis robots, are also known from the prior art in order to handle components of manufacturing apparatuses, for example to undertake various tasks in a manufacturing process or in post-processing, set-up, or other tasks which take place in a manufacturing environment. Such robot devices can also be used for sorting or for other logistical tasks in a storage facility. Such a robot device is usually assigned to a workstation so that it is stationary such that the robot device usually cannot be removed from a fixed workstation. For manufacturing apparatuses with relatively long cycle times, this means that the robot device performs a task and then stands idle until the manufacturing apparatus has completed the manufacturing process and the robot device can be reused. In particular with regard to additive manufacturing processes in which cycle times of many hours to many days are customary, this results in the robot device standing idle for a long time such that, in the worst case scenario, the robot device is operative for less time than it is idle.

Handling devices are furthermore known which have robot devices and a transport device connected to one another, i.e., that the robot device itself is rigidly connected to a movable substructure or a transport device has a multi-axis robot as a fixed constituent part. It is disadvantageous here that advantages that are obtained in principle by the individual devices are lost by the integration of the transport device into the robot device, and vice versa. An energy supply for the transport device or the robot device would be shared, for example, by both devices such that they would have to be designed so that they are correspondingly larger. Likewise, the transport device cannot be used for transporting other modules and the like. Moreover, the transport device is not available when the robot device is being used.

The object of the invention is to provide a handling device, improved compared with the prior art, which enables a higher degree of efficiency with respect to the use of a transport device and a robot device.

As described above, the invention relates to a handling device for a manufacturing environment. Within the scope of this application, a manufacturing environment or manufacturing apparatus can be understood to be any apparatus which is configured to manufacture objects. For example, a manufacturing apparatus can be understood to be an apparatus for the additive manufacturing of three-dimensional objects. Likewise, such a manufacturing apparatus can be designed as a conventional manufacturing apparatus, for example as a milling machine or the like. Assembly apparatuses can also be understood to be manufacturing apparatuses within the sense of the present application, such as those which are used, for example, in the form of conveyor belts or on conveyor belts in order to join together or manufacture an object by assembling different modules. The manufacturing environment can thus of course have any desired combination of different or similar manufacturing apparatuses, in particular additive manufacturing apparatuses can be combined with conventional manufacturing apparatuses or assembly belts.

The transport devices and robot devices described below can consequently perform tasks relating to the individual manufacturing apparatuses or other devices in the manufacturing environment. The transport device can here ultimately be provided for the transporting of any desired modules, containers, or other devices within the manufacturing environment. The robot device can correspondingly perform any desired tasks within the manufacturing environment. These can in particular be post-processing steps for manufactured objects, handling individual tasks in the manufacturing apparatus, for example removing or configuring build plates and objects, tasks in the set-up of the manufacturing apparatus, and the like. It is also possible that the robot device is equipped with fixed or replaceable tools in order to perform assembly tasks and the like.

The invention is based on the insight that the handling device has a coupling device which is designed to couple the or at least one robot device detachably to the transport device, wherein the transport device is designed to transport the at least one robot device to at least one workstation and to uncouple it from the transport device by means of the coupling device. According to the invention, it is thus obtained that the transport device and the robot device can be detachably coupled to each other. This makes it possible for the robot device to be transportable to a specific workstation by means of the transport device and uncouplable from the transport device there. In other words, the transport device can pick up the robot device at a current workstation, move the robot device to a further workstation, and set down the robot device at the further workstation and then, released from the robot device, undertake a further transporting task.

This allows the transport device and the robot device ultimately to be usable separately from each other such that each device can fully exploit its individual advantages. It is furthermore achieved that the robot device can change workstation when required such that, in particular with regard to relatively long cycle times, it does not stand unused at a workstation whilst the robot device could be used at a further workstation. Whilst the robot device is being used, the transport device can perform other tasks and does not have to remain together with the robot device at the workstation because of a rigid coupling of the transport device to the robot device.

A workstation is understood within this application to be any place at which the robot device can be set down and at which the robot device can perform appropriate tasks in the manufacturing environment. The workstation can thus be associated with a specific manufacturing apparatus or a part of a specific manufacturing apparatus. At the workstation, the robot device can in this case perform tasks or interact with the manufacturing apparatus, for example in order to insert or remove a build plate, to remove a manufactured object, to post-process the latter, or to carry out further tasks, for example maintenance or cleaning work on the manufacturing apparatus. The robot device can of course be used at other manufacturing apparatuses, for example conventional manufacturing apparatuses or assembly belts. It is also possible to define a workstation in a storage facility such that the robot device can perform appropriate tasks, for example for sorting or assigning parts, in particular components, in a storage unit.

It can, for example, be specified in a central control device of the manufacturing environment which tasks the robot device and the transport device are to perform or perform next. Accordingly, the robot device can be moved to the next workstation by means of the transport device and set down there so that the robot device can perform the task assigned to it. Whilst the robot device is performing the task, the transport device can perform (transporting) tasks assigned to it, for example the transporting of other modules, robot devices, or the like. The transport device can therefore in particular be understood to be a "mobile" transport device because it can be moved within the manufacturing environment and can transport different modules, tools, robot devices, and other devices in the manufacturing environment.

According to one embodiment of the handling device, it can be provided that the coupling device comprises a lifting device which is designed to lift up the robot device in a transport state relative to a set-down state, wherein the robot device can be transported in the transport state by means of the transport device. In other words, a lifting device which is designed to lift up the robot device can be provided by the coupling device. The robot device can thus be moved by the lifting device between a transport state and a set-down state, in particular lifted up from the set-down state into the transport state and lowered from the transport state into the set-down state. In the set-down state, the robot device can be in contact, in particular by a corresponding frame, with a set-down surface, in particular with the floor of the manufacturing environment or a corresponding manufacturing apparatus.

If the robot device is to be transported, the transport device can be moved accordingly to the robot device, wherein the lifting device causes the robot device to be lifted up in order to transfer the latter into the transport state by the robot device being lifted up relative to the set-down state. In the lifted-up transport state, the transport device can pick up and transport the robot device. If the robot device is moved by the transport device to the next workstation, it can be set down there again by lowering the lifting device such that the transport device can be uncoupled from the robot device and can be used again to perform other tasks.

The lifting device can here be integrated in particular into the robot device or the transport device or connected thereto. For example, the transport device can have an integrated lifting device or the transport device can carry the lifting device. It is also possible that the lifting device is arranged on the robot device itself or is integrated into the latter. For example, the transport device can travel below the robot device in a receiving section of the robot device such that lifting up the robot device, for example supported on the transport device, can be executed by means of the lifting device. As a result, the robot device is lifted up by its frame from the floor and can be transported by means of the transport device. At the next workstation, a lowering movement can be performed and the robot device can be deposited again and set down by the frame on the set-down surface such that the transport device can be detached from the robot device and can undertake other transporting tasks.

The transport device can have, for example, at least one automatedly controlled vehicle or be designed as the same. The at least one robot device is designed, for example, as a multi-axis robot, in particular as a six-axis robot. The transport device can be understood to be a driverless transport vehicle or a so-called automated guided vehicle (AGV). The transport device is here in particular capable of moving automatedly to different workstations and accordingly of picking up or setting down the at least one robot device. In between transporting robot devices, it is also possible with the transport device to move further devices or modules within the manufacturing environment such that the most efficient possible use of the robot device and the transport device can be made.

The handling device can moreover be further developed by at least one pick-up device which is designed to pick up the robot device at the transport device or the robot device at the at least one workstation. The pick-up device can be provided, for example, between the transport device and the robot device or between the robot device and the workstation. It is of course possible to provide a pick-up device both between a robot device and a transport device and between the at least one robot device and the respective workstations. The pick-up device can in particular be understood to be a modular interface by means of which robot devices can be arranged at transport devices or workstations. It is thus in particular possible to pick up a different robot device at different transport devices and at different workstations.

The handling device can moreover have at least one positioning device which is designed to position the at least one robot device, in particular positively, relative to and in particular on the transport device and/or to position the at least one robot device relative to at least one workstation. The positioning device can be configured separately to or together with the pick-up device. The positioning device can be configured, for example, as a so-called "cup-and-cone" connection, wherein it is designed to position the robot device. If the robot device is not placed absolutely precisely, for example by the transport device, in particular the AGV, final positioning of the robot device can be carried out by the positioning device. Such a positioning device can here be provided between the transport device and the robot device and/or between the robot device and the respective workstation. In particular, each transport device, each robot device, and each workstation can have such a positioning device such that, when the robot device is transferred into the appropriate state, for example from the transport state into the set-down state or from the set-down state into the transport state, positioning of the robot device is carried out.

The handling device can moreover have a position-detecting device which is designed to detect a position of the transport device and/or of the at least one robot device, in particular relative to at least one workstation. The position-detecting device here makes it possible, for example in addition or alternatively to the above described positioning device, that the position of the transport device and/or the robot device can be detected. For example, it can be provided by the robot device to position the latter only relatively approximately and to carry out the position determination more precisely by the position-detecting device. To do this, corresponding positioning marks can be provided at a workstation or the transport device for the robot device such that the robot device can determine its position by defined movement to the positioning marks. This can likewise be transposed to the transport device. Other position-detecting means, for example a magnetic strip, a tracking system, in particular a so-called "indoor GPS", optical detection, laser interferometry, triangulation, or the like, can also be provided for the transport device. Precise positioning in the sub-millimeter range can be achieved here in particular when the magnetic strip is used for the guidance and positioning of the transport device.

According to a further embodiment of the handling device, it can be provided that the robot device in a state coupled to the transport device is designed to interact with the manufacturing apparatus or an object, wherein the transport device supplies at least one further machine axis with respect to the robot device. Lastly, a movement of the robot device can be performed by means of coupling the robot device and the transport device. The robot device which, as described above, is configured, for example, as a multi-axis robot can thus perform movements using the links of the robot device which can move about the corresponding axes. The degrees of freedom of movement of the transport device can furthermore be exploited in order to provide additional degrees of freedom or additional machine axes. If the transport device can move, for example, only along one axis, a "seventh axis" can be provided with respect to a six-axis robot.

It is also possible that the transport device enables multiple degrees of freedom of movement, for example two movement directions, or rotations about the vertical axis and the like, which are essentially perpendicular to each other. Accordingly, the machine axes of the robot device can be extended by the movement axes or movement options of the transport device. By virtue of the ability of the transport device to be positioned relatively precisely, for example using a magnetic track, precise positioning of the robot device or the tools of the robot device can thus be obtained.

According to a further embodiment, the handling device can have at least one interface, in particular integrated into the at least one pick-up device, which is designed to connect the at least one robot device to the transport device and/or the manufacturing apparatus and/or an external energy source and/or a control device. The interface can here in particular be used to exchange data with the transport device and/or the robot device or to supply the robot device or the transport device with data and/or energy. The interface can here, for example, have a bus system which enables a corresponding transfer. The robot device and the transport device are supplied with energy, for example in the form of a low-voltage system. The robot device and the transport device can be supplied with information or data via various interfaces, for example by radio, in particular a WLAN, optically, or by cables.

The interface can here be integrated in particular into the above described pick-up device or positioning device. For example, the described "cup-and-cone" connection can provide a corresponding interface which is closed when the robot device is positioned on the transport device or at the workstation such that the supply of energy or supply of data is ensured. This makes it possible in particular for the robot device to be configurable without its own energy supply because, when mounted on the transport device, it can be supplied by the transport device or is supplied at the workstation by the interface of the manufacturing apparatus or manufacturing environment.

According to a further embodiment of the handling device, at least one securing device can be provided which is designed to secure the robot device, in particular when dynamic movements are performed, at the workstation and/or the transport device. Such robot devices are in particular designed to perform highly dynamic movements which cause corresponding accelerations on the robot device or the structure connected to the robot device. The securing device can thus ensure that the robot device is connected securely to the transport device or the workstation. This securing device can therefore be provided between the transport device and the robot device and/or between the robot device and the workstation. The securing device can be provided, for example, as a magnetic coupling or frictional and/or positive coupling. The securing device can here preferably be detachable or adjustable such that when the robot device is moved between the set-down state and the transport state, the force applied by the securing device can be reduced or increased.

According to a further embodiment of the handling device, it can be provided that the transport device is designed to transport the at least one robot device to a workstation provided by the manufacturing apparatus or assigned thereto, depending on a state parameter of the manufacturing apparatus, and set it down, wherein the transport device is designed to perform at least one further transport task for a task duration during which the robot device is interacting with the manufacturing apparatus or the object at the workstation, and moreover is designed, after the task duration has expired, to pick up the robot device at the workstation and transport it to at least one further workstation.

In this embodiment, it is provided that the manufacturing apparatus can have or send appropriate state parameters in particular to a central control device. The control device enables the state parameter to be processed appropriately such that commands can be generated for the transport device and the robot device. As a result, the transport device can pick up the robot device at a current workstation and move it to a new workstation and set the robot device down at the new workstation. At the new workstation, the robot device can perform corresponding interactions with the manufacturing apparatus or the object. For example, the robot device can perform maintenance processes, cleaning processes, set-up processes, post-processing processes, and the like at the manufacturing apparatus. The interaction between the robot device and the object or the manufacturing apparatus at the new workstation can here be identified or characterized by means of a task duration. The task duration states how much time the robot device needs to perform the task at the new workstation.

It is therefore possible, for the task duration or during the task duration, to use the transport device for at least one further transporting task, for example in order to move a further robot device between two workstations or in order to transport another device or another module in the manufacturing environment. Once the task duration has expired, the transport device can, according to the control commands of the control device, pick up the robot device at the new workstation, i.e., pick up the robot device, and transport it to at least one further workstation at which the robot device is required. Evidently, the transport device and the robot device can thus be employed as efficiently as possible because neither of the two devices is coupled rigidly to the other device such that, when a task is performed by one device, the other device would have to stand idle or could not be used.

As well as the handling device, the invention also relates to a manufacturing environment with at least two manufacturing apparatuses which are designed for the in particular additive manufacture of at least one object, wherein the manufacturing environment has at least one above described handling device.

As described above, the manufacturing environment can be understood as any environment or system which has conventional or additive manufacturing apparatuses which provide workstations for robot devices. The transporting of the robot devices between the individual workstations can here be ensured by the handling device. Moreover, as also described above, further transporting tasks can be performed by the transport device. The manufacturing environment can here in particular have further apparatuses, for example post-processing apparatuses, preparation apparatuses, storage facilities, and the like which can also generate corresponding tasks which can be performed by the transport device and/or the robot device.

The manufacturing environment comprises in particular a plurality of additive manufacturing apparatuses, for example various 3D printers. The various manufacturing apparatuses can be based on the same and/or different technologies. For example, at least one apparatus for selective laser sintering or selective laser melting can be provided. At least one manufacturing apparatus can also be configured as a milling machine or as a filament printer. At least one manufacturing apparatus can also have an assembly belt or be configured as such.

The manufacturing environment can moreover have at least one control device which is configured to coordinate different machine processes on the at least two manufacturing apparatuses such that the capacity of the robot device and/or the transport device can be increased. For example, a first machine process can be started on a first manufacturing apparatus, for which purpose the robot device performs corresponding set-up tasks at the first manufacturing apparatus. A second machine process can then be performed on a second manufacturing apparatus depending on the performance of the first machine process on the first manufacturing apparatus such that the robot device which becomes free after the first machine process has begun at the first manufacturing apparatus can be used for handling the second manufacturing apparatus. In particular a cycle time of the individual manufacturing apparatuses can be incorporated here such that the start of the machine processes can be coordinated with the individual manufacturing apparatuses in such a way that the robot device can be used to the optimum capacity.

The individual workstations of the manufacturing environment can here have characteristic interfaces such that the robot device can call up the corresponding program required for performing the task based on the interface to which the robot device is connected at the workstation. If the robot device is docked, for example, at an additive manufacturing apparatus of a corresponding technology, the robot device can call up the appropriate program such that the corresponding interactions can be loaded and performed. At least one workstation, at which a plurality of robots can be arranged or at which a plurality of robot devices work together or interact individually with corresponding manufacturing apparatuses or the same manufacturing apparatus, can be provided in the manufacturing environment.

With respect to assembly processes, the robot device can be configured with specific and/or replaceable tools which are used in particular for specific assembly processes. With respect to the assembly of parts on motor vehicles on an assembly belt, this can in particular mean that the robot device has at least one specific tool for a specific piece of special equipment which is used only for occasional models. If various assembly belts are connected in parallel, the robot device can be moved accordingly to that belt on which a model/object requiring the assembly of the individual special equipment and hence the use of the specific tool is built. This in particular makes it possible that there is no need for such a specific tool or such a specific robot device to be made available for each assembly belt. Instead, the robot device can be moved by means of a transport device to that assembly belt on which the model/object is built which requires the corresponding special equipment.

All the advantages, details, embodiments, and/or features which have been described with regard to the handling device can of course be transposed to the manufacturing environment, and vice versa.

The invention is explained with the aid of exemplary embodiments with reference to the drawings. The drawings are schematic representations.

DETAILED DESCRIPTION OF THE DRAWINGS

Figure 1:
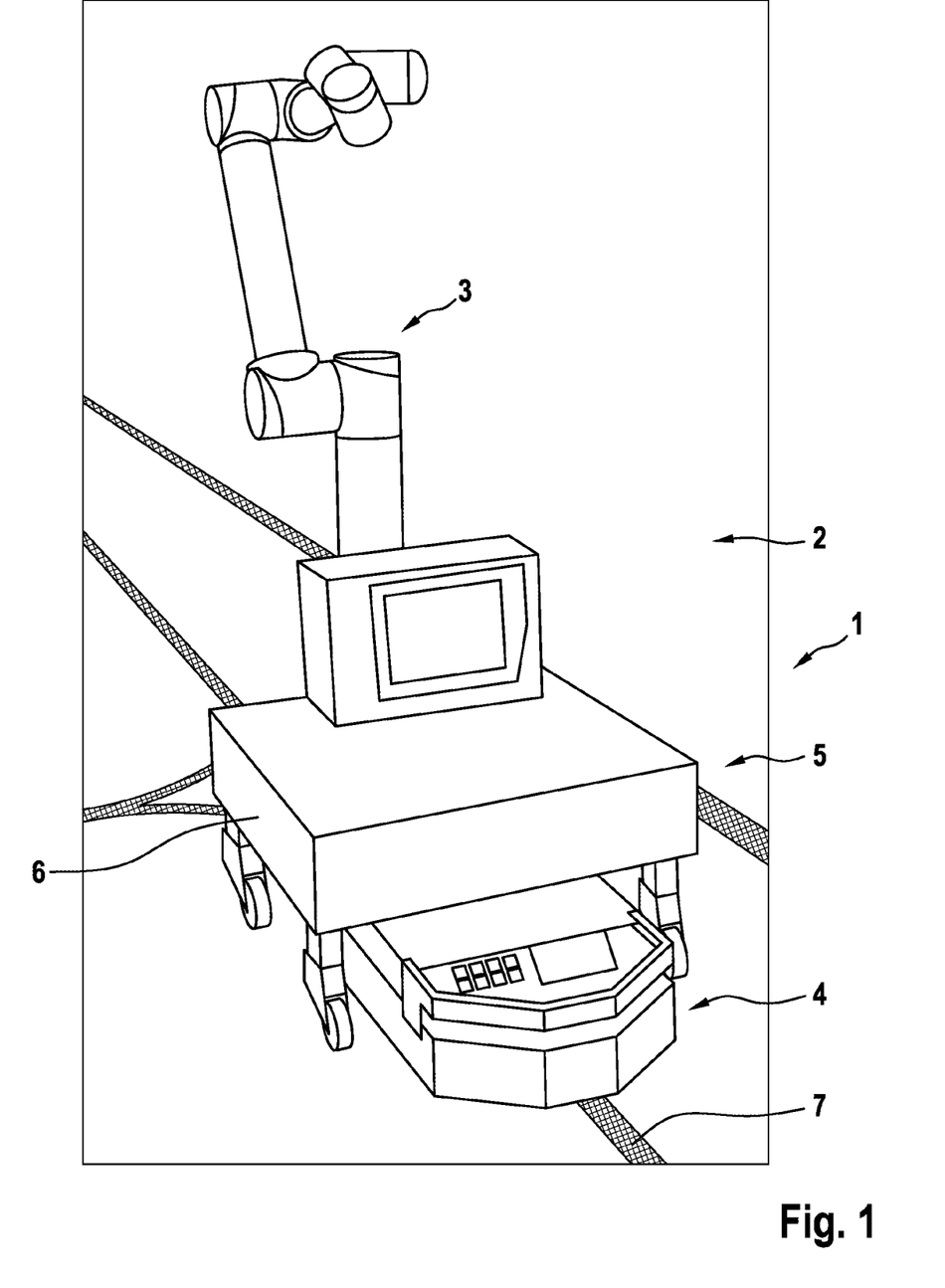
FIG. 1 shows a perspective schematic diagram of a handling device according to a first exemplary embodiment.

FIG. 1 shows s handling device 1 for a manufacturing environment 2, wherein the handling device 1 has a robot device 3, for example a six-axis robot, and a transport device 4, in particular a driverless transport vehicle or a so-called automated guided vehicle (AGV). The robot device 3 and the transport device 4 are coupled detachably to each other by means of a coupling device 5.

The coupling device 5 can, for example, have a lifting device which is arranged on the transport device 4 or is integrated into the transport device 4. The transport device 4 can thus travel below a frame 6 of the set-down robot device 3 and lift up the robot device 3, in particular the frame 6 together with the robot device 3, by means of the lifting device of the coupling device 5 and hence transfer it into a transport state in which the transport device 4 can move the robot device 3. In addition, it is of course also possible that a corresponding lifting device is integrated into the robot device 3, in particular the frame 6, or arranged thereon and carries out the corresponding lifting movement relative to the transport device 4 or relative to a set-down surface, for example the floor of the manufacturing environment 2. In addition, further variants of the coupling of the transport device 4 to the robot device 3 are possible, for example positively, frictionally, in particular magnetically.

The transport device 4 is designed to transport the robot device 3. As described above, the robot device 3 is here detachably coupled to the transport device 4 by means of the coupling device 5 such that it is moved in the transport state together with the transport device 4 or is carried on the latter such that the robot device 3 can be brought to a place where it is to be used. A positioning device, for example in the form of a so-called "cup-and-cone" connection which enables the robot device 3 to be positioned on the transport device 4, can be provided between the transport device 4 and the robot device 3. In the case of such a cup-and-cone connection, a connection partner is cone-shaped and engages in a correspondingly shaped recess or pocket such that deviations from a planned positioning are compensated for by the corresponding conical surfaces or are adjusted when the robot device 3 is set down or lifted up.

As described above, the transport device 4 can move or is controlled in an automated fashion. For example, the transport device 4 can be controlled based on a magnetic strip 7 laid in the manufacturing environment 2. Other control mechanisms are of course additionally or alternatively possible, for example control via radio, "indoor GPS", or optical control signals. The robot device 3 can carry various tools depending on which task the robot device 3 is to perform. The robot device 3 can of course change the corresponding tools such that it is designed for performing a wide range of tasks in the manufacturing environment 2.

The transport device 4 can also execute further transporting tasks, for example transporting containers or modules, in particular build modules for a manufacturing process, in the uncoupled state, i.e., when it is detached from the robot device 3. The transport device 4 can of course also undertake further transporting tasks, for example transporting finished objects. The handling device 1 can moreover have a position-detecting device which is not illustrated in detail. The position-detecting device can allow detection of the position of the transport device 4 and/or the robot device 3, for example via optical detection or by moving to defined positioning marks. For example, the robot device 3 can be controlled in such a way that it moves to positioning marks located in the area surrounding the robot device 3 or a workstation and thus determines the position. As a result, the robot device 3 can be adjusted or calibrated in the environment of the workstation.

It is also possible that, in the transport state, i.e., the state in which the robot device 3 is coupled to the transport device 4, the machine axes of the robot device 3 are extended by the transport device 4. To achieve this, the at least one movement axis of the transport device 4 can be used in addition to the degrees of freedom of movement of the robot device 3. The transport device 4 can thus move at least along one axis but in particular is also rotatable or can move in at least two movement axes. The machine axes provided by the robot device 3 can accordingly be extended or supplemented.

Figure 2:
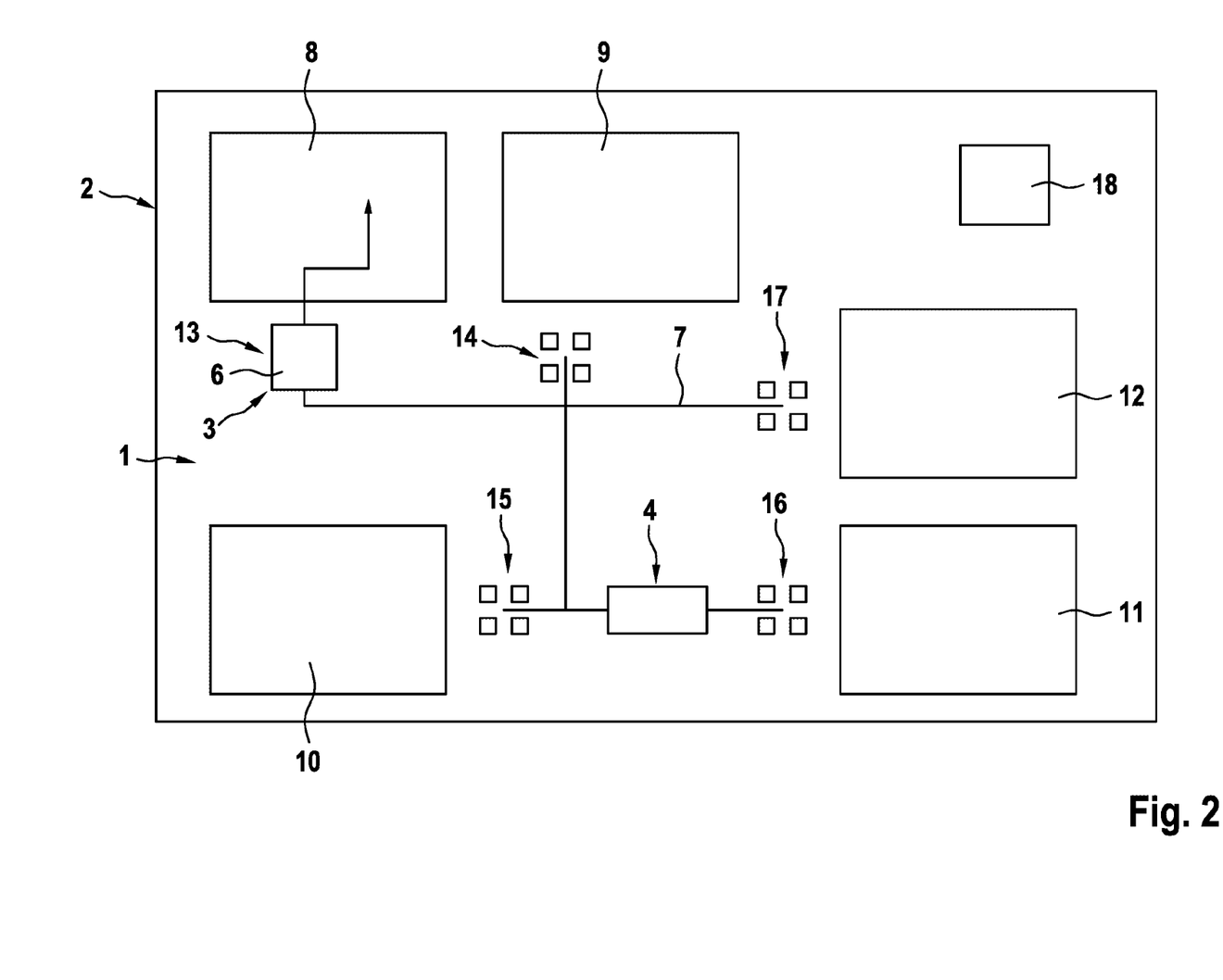
FIG. 2 shows a schematic diagram in plan view of a manufacturing environment according to a second exemplary embodiment.

FIG. 2 shows a manufacturing environment 2 with a handling device 1 in a second exemplary embodiment in plan view. The manufacturing environment 2 here has two manufacturing apparatuses 8, 9 and a storage facility 10, a preparation device 11, and a post-processing device 12. In the situation illustrated in FIG. 2, the robot device 3 is set down at a workstation 13 which is associated with the manufacturing apparatus 8. The other apparatuses 8-12 also have workstations 14-17 into which the robot device 3 can be selectively transported in order to perform corresponding tasks at the respective apparatuses 8-12 or to interact with the latter, handle objects, and the like.

The manufacturing environment 2 can in particular have a central control device 18 which is designed to control the handling device 1, i.e., to specify to which of the workstations 13-17 the robot device 3 is to be brought. In the embodiment shown, the robot device 3 is set down at the workstation 13 and interacts with the manufacturing apparatus 8. In the meantime, the transport device 4 is controlled in such a way that it undertakes further transporting tasks. For example, the transport device 4 conveys modules for the manufacturing process from the storage facility 10 into the preparation device 11. The situation illustrated is of course to be understood as purely an example, wherein the robot device 3 can interact with each of the apparatuses 8-12 and can thus be positioned at each of the workstations 13-17. The transport device 4 can also undertake any desired transporting tasks in the manufacturing environment 2.

In particular a task duration for which it is intended that the robot device 3 remains arranged at the manufacturing apparatus 8, i.e., at the workstation 13, in order to execute the task assigned to it can be defined by the control device 18. The transport device 4 can consequently be used for further transporting tasks during the duration of the task. Once the duration of the task has expired, i.e., the task has been executed or completed by the robot device 3, for example the build plate has been swapped in the manufacturing apparatus 8 or cleaning work, maintenance work, removal of an object, or the like have been effected, the robot device 3 can be picked up by the transport device 4, i.e., the transport device 4 is moved to the workstation 13 and is coupled to the robot device 3 or transfers the robot device 3 into the transport state. In the transport state in which the robot device 3 is coupled to the transport device 4 and can be moved by the latter, the robot device 3 can be moved into the next workstation 14-17 in which the robot device 3 is next required.

The manufacturing apparatus 8, 9 can be understood in this exemplary embodiment to be any desired apparatus which is designed to manufacture an object. The manufacturing apparatus 8, 9 can be understood to be, for example, conventional manufacturing machines, for example milling machines, or additive manufacturing apparatuses, for example apparatuses for selective laser melting. The manufacturing apparatuses 8 can here be designed as identical or different manufacturing apparatuses. The number, the arrangement, and the type of the respective apparatuses 8-12 can of course be freely selected or can be adapted relative to the specific manufacturing environment 2.

The individual workstations 13-17 also have positioning devices which are illustrated by squares. They can also be configured as "cup-and-cone" connections. The positioning devices described can moreover have an interface which is designed to connect the set-down robot device 3 either to the transport device 4 or to the respective workstation 13-17. It is possible to transmit data or supply energy to the robot device 3 via the interface. It can in particular thus be achieved that the robot device 3 is "real-time capable", i.e., that a reaction time of the robot device 3 to a corresponding signal is below a defined time threshold, in particular below 200 ms. As a result, it can be ensured in particular with respect to operational safety that a corresponding switch-off signal causes a sufficiently quick reaction by the robot device 3. It can moreover be achieved by the interface that the robot device 3 does not require its own energy supply. The interface can establish the connection to an external energy supply.

A securing device, which is designed to absorb forces which are generated by a movement of the robot device 3, can moreover be provided at the transport device 4 or at each of the workstations 13-17. For example, such a securing device can be designed as a positive and/or frictional connection. For example, a magnetic coupling can be provided which secures the robot device 3 such that, when dynamic movements are performed by the robot device 3, secure positioning of the robot device 3 continues to be ensured.

Figure 3:
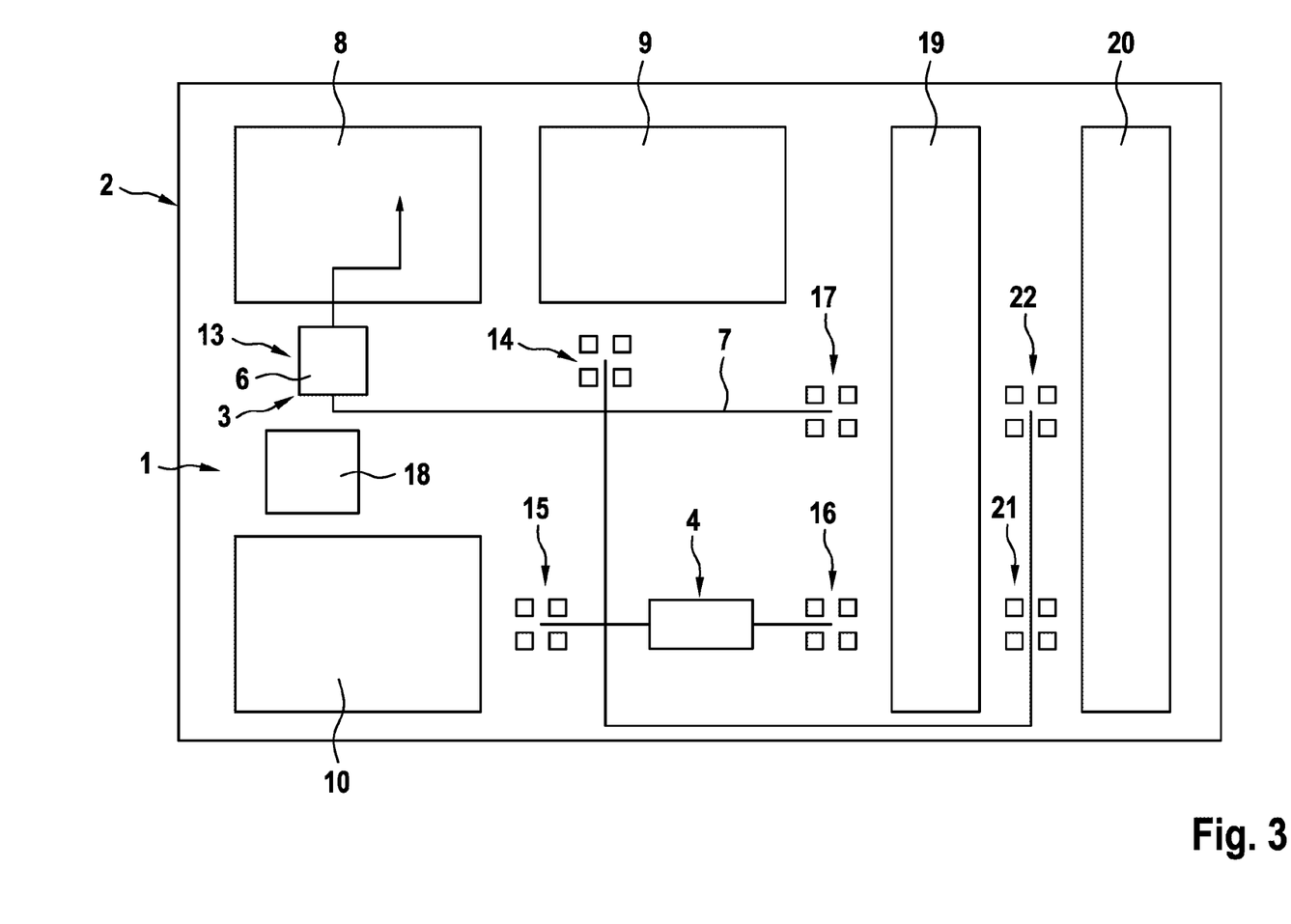
FIG. 3 shows a schematic diagram in plan view of a manufacturing environment according to a third exemplary embodiment.

FIG. 3 shows a manufacturing environment 2 according to a third exemplary embodiment. The fundamental structure of the manufacturing environment 2 is comparable to that of the manufacturing environment 2 in FIG. 2. The same reference numerals are therefore used for the same components or parts of the manufacturing environment 2. The details which were described with reference to FIGS. 1 and 2 are in principle transferrable to the embodiment according to FIG. 3, and vice versa. The manufacturing environment 2 in turn has two manufacturing apparatuses 8, 9 which provide workstations 13, 14. The workstation 15 is in turn associated with a storage facility 10 such that the robot device 3 can, for example, be set down there in order to perform sorting tasks or assignment tasks in the storage facility 10.

The manufacturing environment 2 from FIG. 3 moreover has two assembly belts 19, 20 on which objects are conveyed for assembly. For example, motor vehicles can be assembled on the assembly belts 19, 20. For this purpose, in each case two workstations 16, 17 or 21, 22 are assigned, for example, for each of the assembly belts 19, 20. The robot device 3 is in particular designed to supply an appropriate tool by means of which a module can be assembled on a vehicle. When the assembly of such a module is required, the transport device 4 can move the robot device 3 to one of the workstations 16, 17, 21, 22 and set it down there such that the robot device 3 can perform the corresponding assembly task.

In particular with regard to modules which are installed in just a few models/vehicles, the need to hold multiple versions of the same tool available can consequently be prevented. Instead, when required, the robot device 3 can provide the tool at the corresponding workstation 16, 17, 21, 22. The number of assembly belts 19, 20 is of course not limited to two assembly belts 19, 20. Instead, any number of assembly belts 19, 20 with any number of workstations 16, 17, 21, 22 can be provided.

In the manufacturing environment 2 illustrated in FIG. 3, it is also possible to remove a component produced by means of the manufacturing apparatus 8, 9, for example an object manufactured additively, by means of the robot device 3 and move it by means of the transport device 4 to one of the workstations 16, 17, 21, 22, where the object can be assembled, for example on a motor vehicle. The transport device 4 can of course alone also transport objects or devices from the manufacturing apparatuses 8, 9, from the storage facility 10, or between the assembly belts 19, 20.

The number of robot devices 3 and transport devices 4 can of course also be freely selected. A plurality of handling apparatuses 1 can also be associated with the manufacturing environment 2. Each of the handling devices 1 can in turn have any number of transport devices 4 and robot devices 3. The routes traced by the magnetic strip 7 and which the transport device 4 can follow can of course be freely selected and are illustrated only schematically. In particular, it can be provided that each of the workstations 13-17, 21, 22 can be visited separately. In addition to the magnetic strip 7 or as an alternative to the magnetic strip 7, other types of control of the transport device 4 are also possible, for example by means of radio, optically, or otherwise.

Figure 4:
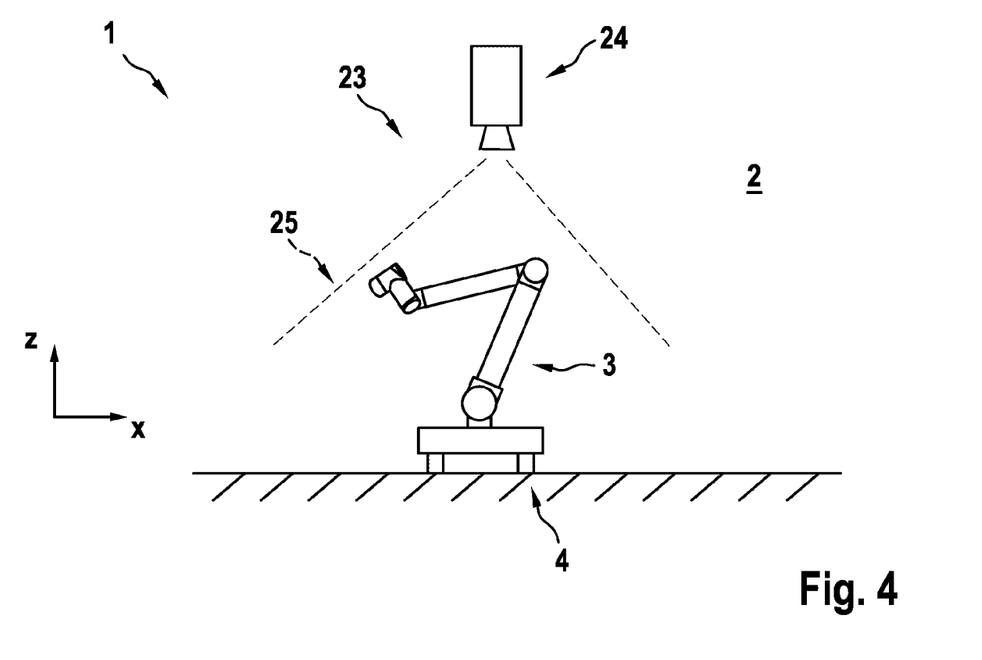
FIG. 4 shows a schematic diagram of a position-detecting device of a manufacturing environment in a side view according to a fourth exemplary embodiment.

FIG. 4 shows a detail of a handling device 1 of a manufacturing environment 2 according to a fourth exemplary embodiment. The handling device 1 can here have a position-detecting device 23 which is designed to detect the position of the robot device 3 and the transport device 4 individually or when coupled. The robot device 3, coupled to the transport device 4, is illustrated in FIG. 4. It is here also possible that the position-detecting device 23 can detect the position of the robot device 3 in a set-down state, or the position of the transport device 4 in the uncoupled state.

The position-detecting device 23 has at least one detecting element 24, for example a camera, which is arranged in particular in the region of a ceiling of the manufacturing environment 2. The position-detecting device 23 can here have in particular a plurality of detecting elements 24, for example a plurality of cameras arranged in a ceiling region of the manufacturing environment 2. Each of the detecting elements 24 here has a detection area 25 within which the detecting element 24 is designed to detect the position or orientation of the robot device 3 and/or the transport device 4. The individual detection areas 25 can at least partially overlap or adjoin one another. Detecting elements can also be provided only or more concentratedly in the regions of workstations 13-17, 21, 22.

Figure 5:
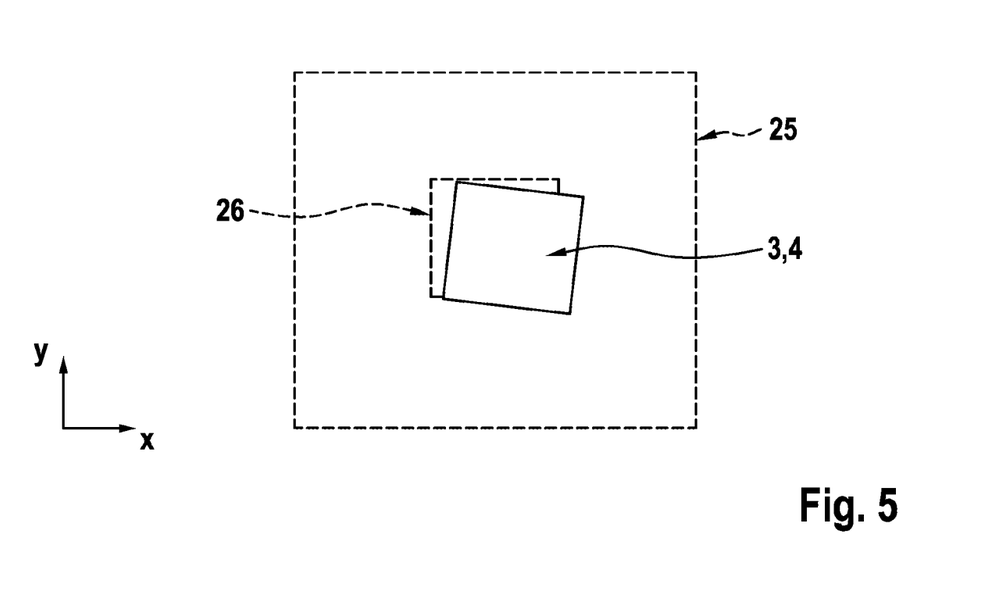
FIG. 5 shows a schematic diagram of a position-detecting device according to FIG. 4 in plan view.

The detection area 25 is illustrated schematically in a plan view in FIG. 5, wherein the robot device 3 and the transport device 4 are illustrated offset relative to a target area 26. In other words, the position-detecting device 23 can detect optically, in particular via a network of cameras on a hall ceiling of the manufacturing environment 2, the actual position of the robot device 3 and the transport device 4. The detected actual position can be compared with a target position or the target area 26 which can be stored, for example, in the control device 18.

For example, positional errors in the x and y direction can thus be detected. Errors with reference to an angle about the z-axis can also be detected. The detected positional errors can then be fed to the robot device 3 and/or the transport device 4. For example, it can be effected by means of the control device 18 that a repositioning of the robot device 3 is carried out by the transport device 4. The at least one detected positional error can also be fed to the control system of the robot device 3 and thus taken into account. The robot device 3 can in other words be controlled based on the detected positional error in order to compensate the positional error during the movements performed by the robot device 3.

The position-detecting device 23 can, in addition to or as an alternative to the above described positioning device, be provided in particular in the form of a "cup-and-cone" connection. If the position-detecting device 23 is provided as an alternative to the described positioning device, in particular as an alternative to the pick-up device, the robot device 3 can be supplied with energy by a separate energy supply. For this purpose, the robot device 3 has an electrical energy storage module which is independent in particular from the energy supply of the transport device 4. For example, the robot device 3 can have a battery installed in the robot device 3. As a result, the flexibility compared with a manufacturing environment 2 with positioning systems provided fixedly in a hall floor can be further increased.

The advantages, details, and features shown in the individual embodiments can of course be transferred to one another, exchanged with one another, and combined with one another.

LIST OF REFERENCE CHARACTERS 1 handling device
2 manufacturing environment
3 robot device
4 transport device
5 coupling device
6 frame 7 magnetic strip
8, 9 manufacturing apparatus
10 storage facility
11 preparation device
12 post-processing device
13-17 workstation
18 control device
19, 20 assembly belt
21, 22 workstation
23 position-detecting device
24 detecting element
25 detection area
26 target area

The invention claimed is:

1. A handling device for a manufacturing environment, comprising:
    a manufacturing apparatus for additive manufacturing of an object;
    a robot device;
    a transport device;
    wherein the robot device is configured to interact with at least one component of the manufacturing apparatus;
    a coupling device which is configured to couple the robot device detachably to the transport device;
    wherein the transport device is configured to transport the robot device to at least one workstation and to uncouple the robot device from the transport device by the coupling device; and
    a positioning device which is configured to position the robot device relative to the transport device and to position the robot device relative to the at least one workstation, wherein the positioning device is configured as a cup-and-cone connection where a connection partner is conically cone-shaped and engages in a correspondingly conically shaped recess or pocket such that a deviation from a planned position of the robot device relative to the transport device or of the robot device relative to the at least one workstation is compensated for or adjusted by the corresponding conically shaped connection partner and recess or pocket;
    wherein the coupling device comprises a lifting device which is configured to lift up the robot device from a floor at a first workstation such that it is transportable by the transport device and to lower the robot device to set the robot device on the floor at a second workstation.

2. The handling device according to claim 1, wherein the transport device has at least one automatedly controlled vehicle or is the at least one automatedly controlled vehicle and the robot device is a multi-axis robot.

3. The handling device according to claim 1, further comprising a position-detecting device which is configured to detect a position of the transport device and/or of the robot device relative to the at least one workstation.

4. The handling device according to claim 2, wherein the robot device in a state coupled to the transport device is configured to interact with the manufacturing apparatus and wherein the transport device supplies an additional axis with respect to the robot device.

5. The handling device according to claim 1, further comprising an interface integrated into a pick-up device which is configured to connect the robot device to the transport device or the manufacturing apparatus or an external energy source or a control device.

6. The handling device according to claim 1, further comprising a securing device which is configured to secure the robot device at the at least one workstation and/or at the transport device.

7. The handling device according to claim 1, wherein the transport device is configured to transport and set down the robot device to a workstation provided by the manufacturing apparatus depending on a state parameter of the manufacturing apparatus and wherein the transport device is configured to perform at least one further transport task for a task duration in which the robot device interacts with the manufacturing apparatus or an object at the workstation and, after the task duration has expired, to pick up the robot device at the workstation and transport it to at least one further workstation.

8. A manufacturing environment, comprising:
    at least two manufacturing apparatuses which are configured for additive manufacturing of at least one object; and
    the handling device according to claim 1.

* * * * *